Patented Mar. 18, 1952

2,589,688

UNITED STATES PATENT OFFICE 2,589,688

METHOD OF PREPARING LINEAR POLYESTERS

Paul J. Flory, Kent, and Frederick S. Leutner, Cuyahoga Falls, Ohio, assignors to Wingfoot Corporation, Akron, Ohio, a corporation of Delaware No Drawing. Application July 16, 1946, Serial No. 683,990

9 Claims. (Cl. 260—75)

This invention relates to a new and superior method for preparing linear polyesters and to linear polyesters prepared thereby having exceptionally high molecular weights.

Linear polyesters prepared by the condensation of glycols and dibasic acids are well known to the art and have been extensively investigated by W. H. Carothers and his co-workers. The prior art discloses methods for synthesizing various superpolymers, including the superpolyesters, prepared by reversible reactions wherein moderately volatile by-products, such as water, are evolved; for example, polymeric ethylene succinate may be prepared by the prolonged heating together of ethylene glycol and succinic acid. It is well known that the formation of high molecular weight condensation products requires that the reaction be carried very nearly to completion. In the preparation of polyesters by reversible methods, it is necessary that efficient methods for removal of the water, or other by-product, be used, in order that the condensation is not impeded by the occurrence of the reverse reaction. Consequently the prior art is concerned with special methods for removing the by-products, for example, the use of a molecular still or other operations involving the use of low pressures with inert gas bubbling through the molten superpolymer. Furthermore, when these comparatively slow reversible reactions are employed, undesirably long reaction periods are required to achieve a desirable molecular weight.

One purpose of this invention is to provide a method for the preparation of certain polyesters by a non-reversible condensation reaction. Another purpose of this invention is to prepare high molecular weight polyesters in a much shorter period of time than is required by prior art methods. A further purpose of this invention is to prepare linear polyesters of unusually high molecular weight. A further purpose is to provide a method for preparing certain polyesters containing aromatic dibasic acid units, said polyesters being prohibitively difficult to prepare by previously known methods.

These objects are accomplished by co-reacting one of a specific class of glycols in a high state of purity with a pure diacid chloride of a suitable aromatic dibasic acid. The reaction between the glycol and the dibasic acid chloride may be indicated as follows:

HO—R—OH+ClCO—R'—COCl→
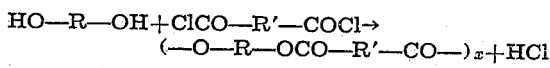+HCl

This condensation reaction differs from those disclosed in the prior art by being non-reversible; that is, the glycol and the dibasic acid chloride cannot be regenerated by the action of hydrogen chloride on the polyesters. Furthermore, the condensation is not impeded by the presence of the by-product, which in this case is hydrogen chloride. However, it is usually desirable to permit rapid evolution of the hydrogen chloride during the reaction. The evolution of hydrogen chloride proceeds without the necessity of resorting to special methods, such as maintenance of high vacuum or blowing with inert gas for prolonged periods, to achieve its removal.

One of the principal beneficial results achieved by the practice of this invention is the exceedingly rapid rate of reaction. Whereas it is customary to heat a dibasic acid with a glycol for a period of several days at a high temperature in order to reach a molecular weight which is adequate for the attainment of optimum physical properties, this method merely requires heating at moderate temperatures and for a few hours at most, and often the polymerization is substantially complete after heating for less than one hour. Because of the low temperature required and the short period of heating, the products are obtained in a colorless or a very light colored condition, being substantially unaffected by oxidation and other undesirable side reactions. Because of the rapidity and the non-reversible nature of this reaction, linear polyesters of exceptionally high molecular weights can be prepared. The acid chloride method can be used to prepare polyesters which cannot be prepared by the acid method due to the high melting point and the low solubility of the acids. This is particularly true of terephthalic acid and isophthalic acid.

The method of this invention is not applicable to the preparation of superpolymers from all glycols, and polymers of the desired high molecular weight are not obtained by the condensation of some glycols, for example, ethylene glycol with dibasic acid chlorides. In particular, it has been found that any glycol in which the hydroxyl groups are separated by more than three atoms is useful. The glycols may be represented by the structural formula:

in which R may be any divalent cycloaliphatic hydrocarbon, aliphatic hydrocarbon, aliphatic thiahydrocarbon and aliphatic oxahydrocarbon radical having at least four atoms, which may include an oxygen or a sulfur atom as well as carbon atoms, in the shortest chain between the two valence bonds. Thus, suitable glycols which may be used in the practice of this invention are tetramethylene glycol, hexamethylene glycol, decamethylene glycol, diethylene glycol, triethylene glycol, 1,4-quinitol, tetraethylene glycol, 2,2'-dihydroxy diethyl sulfide and 3,3'-dihydroxy dipropyl sulfide. Various homologues of the above dihydroxy hydrocarbons, dihydroxy oxahydrocarbons, and dihydroxy thiahydrocarbons may also be used, provided there are at least four atoms in the shortest molecular chain between the two hydroxyl groups.

This invention is not applicable for condensing the above-defined glycols with all aromatic dibasic acid chlorides, for example, the acid chloride of phthalic acid is not practicable, on account of the comparatively low molecular weight of the products obtained. Suitable acid chlorides are the dibasic acid chlorides having each carbonyl group attached directly to a benzene ring, and in which the shortest molecular chain between the two carbonyl groups contains at least four atoms. Thus, useful acid chlorides of this type are terephthalyl chloride, 1,4-naphthylene-dicarboxylic acid dichloride, 1,7-naphthylene dicarboxylic acid dichloride, the diacid chloride of m,m'-diphenic acid and the acid chlorides having the structure

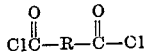

in which R is any arylene or alkyl-substituted arylene radical in which the shortest chain between the carbonyl radicals contains at least four carbon atoms.

Another suitable class of aromatic dicarboxylic acid chlorides is that in which both carbonyl groups are directly attached to the same benzene ring and the shortest chain between the carbonyl groups contains at least three carbon atoms. Suitable acid chlorides of this type are terephthalyl chloride, isophthalyl chloride and 1,3-naphthylene dicarboxylic acid chloride.

According to the practice of the present invention, polyesters are prepared by mixing molecular equivalent quantities of the glycol and the dibasic acid chloride. In some cases it is preferred to add the glycol to the dibasic acid chloride in successive portions, or in small increments, at a rate such that there is no appreciable accumulation of unreacted glycol. Usually it is sufficient, however, merely to mix the total reactants in a single step. Portionwise addition of dibasic acid chloride to the glycol usually is undesirable; the hydrogen chloride released by the main reaction may react with the glycol, or induce it to etherify or to undergo other side reactions. If one or the other of the reactants is a solid at room temperature, it may be necessary to warm the mixture in order to effect complete solution; otherwise the reaction ordinarily begins at room temperature or slightly above with evolution of hydrogen chloride and a spontaneous rise in temperature. As the process proceeds, the mixture is warmed gradually to a temperature in the vicinity of 200° C., or to whatever temperature is required to maintain the mixture in the molten condition in the event that its melting point is above 200° C. After maintaining the reaction mixture at this temperature for a few minutes, evolution of hydrogen chloride subsides and the polymerization is substantially complete. In some cases an additional, but relatively small, increase in molecular weight can be secured by heating for an additional 30 to 150 minutes. Hydrogen chloride is swept from the molten polymers by passing a stream of inert gas, such as oxygen-free nitrogen, through the melt. Intermittent application of reduced pressure usually aids in the removal of bubbles from the viscous mass. The presence of traces of oxygen in contact with the polymer at high temperatures leads to undesirable degradative reactions and other side reactions which cause discoloration of the polymer.

Ordinarily, it is desirable to employ reactants which are in a high state of purity; they should be at least 98 percent pure and preferably 99.5 percent or better. Otherwise, very high molecular weight products cannot be secured. Similarly, it is desirable to employ the reactants in very nearly molecularly equivalent proportions; preferably less than one percent excess of either reactant is used. Exceptions occur when one or the other reactant is lost by volatilization during the polymerization. In this case an excess of this reactant must be employed to compensate for the amount lost during polymerization.

It is true that certain impurities present in small amounts do not interfere with the progress of the polymerization; for example, certain bifunctional impurities which co-react with the main reactants may not exert a deleterious influence when present in small quantity. Certain other impurities, for example, inert materials, can be compensated for by employing an appropriate "excess" of the slightly impure co-reactant. The generalizations in the preceding paragraph concerning the desirability of employing pure reactants have been drawn without consideration for these exceptions. Usually the precise nature of the impurities present in small amount is not definitely known. Consequently, it is sound practice to specify high purity in the starting materials.

The extent of polymerization, or number average molecular weight, can be estimated from a measurement of the viscosity of the molten polymer. A convenient method for measuring melt viscosity is described in the Journal of the American Chemical Society, 62, 1057 (1940). The average molecular weight M is related to the melt viscosity according to the empirical equation $\log \eta = A + BM^{1/2}$ where $\eta$ is the viscosity in poises, and A and B are constants. These constants can be established by measuring the melt viscosities of polymers of known molecular weights. Polymers of known molecular weights can be prepared according to the process of the present invention by co-reacting the dibasic acid chloride with a predetermined excess of the glycol. The molecular weights can then be estimated by calculations based on the amount of glycol employed in excess of equivalency (equations given in the literature on condensation polymers can be employed in excess of equivalency); equations given in the literature on condensation polymers can be employed for this purpose (see J. Am. Chem. Soc. 56, 1877 (1936); J. Am. Chem. Soc., 62, 1057, 2255 (1940). The constants, A and B, in the above equation vary somewhat from one polyester to another, depending on the particular pair of co-reactants employed. However, this variation generally is small, and consequently it is not always necessary to evaluate the constants for each polyester. Rough estimates of molecular weight can be made from the melt viscosity by employing the constants known to apply to an analogous polymer.

Polyesters having molecular weights above about 10,000 are prepared with difficulty by prior art methods employing reversible condensation reactions. Only in a few cases have polymers with molecular weights above 15,000 been prepared by these methods. The non-reversible acid chloride method on the other hand generally produces polymers having molecular weights above 15,000. Often the molecular weights exceed 25,000 and in some cases they have been estimated to exceed 30,000 or even 35,000.

The methods of this invention may also be used to prepare condensation products from a plurality of the glycols and one of the acid chlorides of the diabasic acids, from one of the glycols and a plurality of the acid chlorides of dibasic acids, or from a mixture of two or more glycols and two or more of the acid chlorides. These interpolymeric condensation products are usually more thermoplastic and less crystalline than those prepared from a single glycol and a single acid chloride. The interpolymeric types are usually less desirable for the preparation of filaments and fibers. As described above, the interpolymeric types are usually and preferably prepared from pure reagents and in equimolar proportions.

The polymers are frequently crystalline solids at room temperatures and have melting points which depend upon the particular combination of reactants employed. Some of the polymers, for example, those made from the polyethylene glycols, are usually viscous liquids at room temperatures and others are decidely rubber-like. Generally, the polymers can be converted to a liquid or non-crystalline state by heating.

The polyesters prepared in accordance with this invention are useful compositions for the preparation of fibers, sheets, and other molded shapes. The compositions may be extruded in either the molten state, or in solution in suitable solvents through orifices or dies and subsequently solidified by cooling, or in the case of solutions, by contacting with a drying atmosphere or other means for removing the solvent. The fibers which are prepared from the high molecular weight compositions are capable of being cold drawn, which operation produces a reduction in the extensibility and increases the tensile strength of the filament. The tensilized filaments are useful in the preparation of woven fabrics or as bristles in the manufacture of brushes. Smooth sheets or films of the polymers may be prepared by casting the polymer solutions on smooth surfaces, or by calendering the polymer between rollers, heating if necessary to soften the polymer. The interpolymeric condensation products are not useful in the preparation of filaments but can be used as coating compositions, films and as rubber substitutes. Generally, any of the crystalline or non-crystalline types may be fabricated to form articles of irregular shape by molding under the influence of heat and pressure.

Further details of the preparation of polyesters in accordance with this invention are set forth in the following examples.

*Example 1*

A glass reaction vessel was provided with a pipette type of viscometer adapted to measure the viscosity at reaction temperatures, and was vented through a two-way valve leading to the atmosphere or to a vacuum pump. The pipette was adjustable to permit immersion in the polymer and to enable the introduction of oxygen-free nitrogen below the surface of the reaction mass. The reaction vessel was immersed in a heating bath for maintaining uniform temperature control.

To 4.473 parts by weight of carefully purified terephthalyl chloride 2.025 parts of pure tetramethylene glycol (1.020 molar equivalents) were added. The reaction, which started spontaneously at room temperature with a vigorous evolution of heat, subsided in about ten minutes with the formation of a solid polyester. The temperature of the reaction vessel was then increased to 200° C. and the polyester melted to form a clear colorless liquid. Upon melting, the chemical reaction again proceeded and after five minutes the reaction mass again solidified. The reaction mass was then melted by increasing the temperature to 255° C. which was maintained for one hour. A vacuum 10 mm. total pressure was applied intermittently for about 15 minutes to remove gas bubbles consisting of hydrogen chloride gas. The melt viscosiy was measured at the end of the reaction and found to be 684 poises at 255° C., representing an estimated number average molecular weight of about 15,000. Fibers were drawn from the melt and cold-drawn to form strong elastic fibers. The polyester was light amber in color and had a melting point of 218–219° C. The reaction may be represented by the equation:

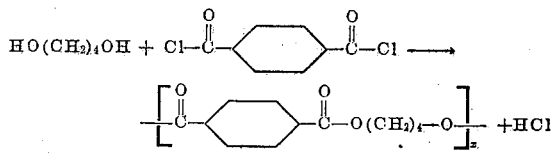

To demonstrate the distinction beween the invention described herein and the prior art methods involving the reaction between dibasic acids and glycols, terephthalic acid and a 5 percent excess of teramethylene glycol were heated for 122 hours at 218° C. The resulting composition was a mixture of terephthalic acid and a very low molecular weight polymer.

The critical nature of the glycols having four or more atoms was demonstrated by reacting 5.723 parts by weight of terephthalyl chloride and 1.832 parts of ethylene glycol (4.7 percent excess over molar equivalent) at 255° C. to give a homogeneous polymer having a melt viscosity of less than 1.0 poise. When vacuum was applied to remove bubbles of hydrogen chloride the polymer decomposed.

*Example 2*

Using the equipment described in the preceding example and the identical procedure, 5.825 parts by weight of pure isophthalyl chloride and 4.998 grams of decamethylene glycol were reacted at 110° C. for 30 minutes, then at 176° for 10 minutes, at 218° C. for 25 minutes, and finally at 255° C. for one hour. The melt viscosity of the product was 1400 poises at 255° C. and 2900 poises at 218° C., corresponding to a molecular weight of about 25,000. At room temperature the polyester was a colorless somewhat rubbery mass which crystallized upon stretching.

Molecular equivalents of isophthalyl chloride and ethylene glycol were combined at gradually increasing temperatures from 110° C. to 218° C. The product was a heterogeneous fluid mass containing isophthalic acid and low molecular weight polymers.

*Example 3*

Using the apparatus described in Example 1, 5.000 parts by weight of pure terephthalyl chloride and 4.292 parts of decamethylene glycol were heated first at 110° C. for 20 minutes, then at 176° C. for 25 minutes, then at 218° for 15 minutes, and finally for 25 minutes at 255° C. The melt viscosity was too great to measure with the pipette viscometer; the viscosity probably exceeded 50,000 poises indicating a number average molecular weight substantially above 35,000. The polyester had a melting point of about 125° C. and fibers drawn from the melt were capable of being cold drawn. The fibers showed good strength and resistance to moisture.

Decamethylene glycol and terephthalic acid were reacted by heating at 218° C. for 224 hours. The polymer so obtained has a melt viscosity of of less than 5 poises and contained unreacted terephthalic acid suspended therein.

*Example 4*

Using the equipment and procedure described in Example 1, 6.63 parts by weight of terephthalyl chloride and 3.466 parts of diethylene glycol were heated at 110° C. for 30 minutes and then at 218° C. for one hour. The polymer so obtained was an amorphous, colorless and somewhat rubbery mass and had a melt viscosity of 610 poises, corresponding to a number average molecular weight of at least 15,000.

Although the invention is described with respect to specific embodiments thereof, it is not intended that the details shall be construed as limitations upon the scope of the invention except to the extent included within the following claims.

We claim:

1. A method of preparing a superpolyester which comprises reacting, solely by condensation with the elimination of gaseous hydrogen chloride, a mixture containing, as the sole reactants, equimolecular proportions of (A) at least one glycol in which the shortest chain between the hydroxyl groups contains at least four atoms and which has the structural formula

HO—R—OH in which R is a divalent radical of the group consisting of cycloaliphatic hydrocarbon, aliphatic hydrocarbon, aliphatic oxahydrocarbon and aliphatic thiahydrocarbon radicals, and (B) at least one acid chloride having the structural formula

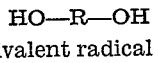

in which R is a divalent aromatic radical in which the

radicals are the sole reactive groups and in which the shortest chain between the carbonyl groups has at least four carbon atoms, each of said carbonyl radicals being attached directly to a benzene ring, until the product has a number average molecular weight of at least 10,000.

2. A method of preparing a superpolyester which comprises reacting, solely by condensation with the elimination of gaseous hydrogen chloride, a mixture containing, as the sole reactants, equimolecular proportions of (A) at least one glycol in which the shortest chain between the two hydroxyl groups contains at least four atoms and which has the structural formula

HO—R—OH in which R is a divalent radical of the group consisting of cycloaliphatic hydrocarbon, aliphatic hydrocarbon, aliphatic oxahydrocarbon and aliphatic thiahydrocarbon radicals, and (B) at least one acid chloride having the structural formula

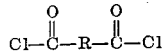

in which R is a divalent aromatic hydrocarbon radical in which the shortest chain between the carbonyl groups has at least three carbon atoms and in which both carbonyl groups are attached directly to the same benzene ring, until the product has a number average molecular weight of at least 10,000.

3. A method of preparing a superpolyester which comprises reacting, solely by condensation with the elimination of gaseous hydrogen chloride, a mixture containing, as the sole reactants, equimolecular proportions of decamethylene glycol and terephthalyl chloride, until the product has a number average molecular weight of at least 10,000.

4. A method of preparing a superpolyester which comprises reacting, solely by condensation with the elimination of gaseous hydrogen chloride, a mixture containing, as the sole reactants, equimolecular proportions of decamethylene glycol and isophthalyl chloride, until the product has a number average molecular weight of at least 10,000.

5. A method of preparing a superpolyester which comprises reacting, solely by condensation with the elimination of gaseous hydrogen chloride, a mixture containing, as the sole reactants, equimolecular proportions of diethylene glycol and terephthalyl chloride, until the product has a number average molecular weight of at least 10,000.

6. A method of preparing a superpolyester which comprises reacting, solely by condensation with the elimination of gaseous hydrogen chloride, a mixture containing, as the sole reactants, equimolecular proportions of tetramethylene glycol and terephthayl chloride, until the product has a number average molecular weight of at least 10,000.

7. A method according to claim 1 in which the reaction is carried out in the form of a melt.

8. A method of preparing a superpolyester which comprises reacting, solely by condensation with the elimination of gaseous hydrogen chloride, a mixture containing, as the sole reactants, equimolecular proportions of (A) a glycol in which the shortest chain between the hydroxyl groups contains at least four atoms and which has the structural formula

HO—R—OH in which R is a divalent radical of the group consisting of cycloaliphatic hydrocarbon, aliphatic hydrocarbon, aliphatic oxahydrocarbon and aliphatic thiahydrocarbon radicals, and (B) isophthaloyl chloride, until the product has a number average molecular weight of at least 10,000.

9. A method according to claim 8 in which the glycol is tetramethylene glycol.

PAUL J. FLORY.
FREDERICK S. LEUTNER.

(References on following page)

REFERENCES CITED

The following references are of record in the file of this patent:

UNITED STATES PATENTS

| Number | Name | Date |
|---|---|---|
| 2,012,267 | Carothers | Aug. 27, 1935 |
| 2,094,608 | Kritchevsky | Oct. 5, 1937 |
| 2,224,037 | Brubaker et al. | Dec. 3, 1940 |
| 2,312,879 | Christ | Mar. 2, 1943 |
| 2,314,972 | Dreyfus | Mar. 30, 1943 |
| 2,333,639 | Christ et al. | Nov. 9, 1943 |
| 2,437,046 | Rothrock et al. | Mar. 2, 1948 |
| 2,465,150 | Dickson | Mar. 22, 1949 |
| 2,465,319 | Whinfield et al. | Mar. 22, 1949 |

FOREIGN PATENTS

| Number | Country | Date |
|---|---|---|
| 849,985 | France | Aug. 28, 1939 |
| 63,874 | Denmark | Aug. 27, 1945 |
| 578,079 | Great Britain | June 14, 1946 |

OTHER REFERENCES

Wertheim, Textbook of Organic Chemistry (page 193), 2nd ed., 1945, pub. by Blakeston Co., Phila., Pa.